(12) United States Patent
Laws

(10) Patent No.: US 9,547,097 B2
(45) Date of Patent: Jan. 17, 2017

(54) MARINE VIBRATOR SWEEPS

(75) Inventor: Robert Laws, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 331 days.

(21) Appl. No.: 14/003,769

(22) PCT Filed: Mar. 12, 2012

(86) PCT No.: PCT/IB2012/051153
§ 371 (c)(1),
(2), (4) Date: Sep. 6, 2013

(87) PCT Pub. No.: WO2012/123883
PCT Pub. Date: Sep. 20, 2012

(65) Prior Publication Data
US 2013/0336087 A1 Dec. 19, 2013

Related U.S. Application Data

(60) Provisional application No. 61/452,356, filed on Mar. 14, 2011.

(51) Int. Cl.
G01V 1/38 (2006.01)
G01V 1/28 (2006.01)

(52) U.S. Cl.
CPC .............. *G01V 1/3808* (2013.01); *G01V 1/28* (2013.01); *G01V 1/38* (2013.01); *G01V 1/3861* (2013.01)

(58) Field of Classification Search
CPC .......... G01V 1/28; G01V 1/38; G01V 1/3808; G01V 1/3861

USPC ....................................................... 367/7, 15
See application file for complete search history.

(56) References Cited

U.S. PATENT DOCUMENTS

| 4,168,485 | A |   | 9/1979  | Payton et al. |
|-----------|---|---|---------|---------------|
| 4,598,392 | A | * | 7/1986  | Pann ............... G01V 1/005 367/189 |
| 4,680,741 | A |   | 7/1987  | Wales et al. |
| 4,782,446 | A |   | 11/1988 | Ehler et al. |
| 4,918,668 | A | * | 4/1990  | Sallas ............... G01V 1/006 367/138 |
| 6,049,507 | A |   | 4/2000  | Allen |
| 6,151,556 | A |   | 11/2000 | Allen |
| 6,152,256 | A |   | 11/2000 | Favret et al. |
| 6,512,980 | B1 | * | 1/2003 | Barr ............... G01V 1/3808 367/159 |

(Continued)

FOREIGN PATENT DOCUMENTS

WO   2012123884   9/2012

OTHER PUBLICATIONS

"Pareto principle," 2010, Wikipedia, downloaded Sep. 4, 2015 from https://en.wikipedia.org/w/index.php?title=Pareto_principle&oldid=349298535, 6 pp.*

(Continued)

*Primary Examiner* — Daniel L Murphy
(74) *Attorney, Agent, or Firm* — Kevin B. McGoff

(57) ABSTRACT

Marine seismic survey using one or more marine seismic vibrators, where the vibrator sweep function is based on a quality requirement, which may be a final image quality requirement or an environmental requirement. The sweep function may be nonlinear and the energy spectrum may not match the energy spectrum of an airgun.

20 Claims, 7 Drawing Sheets

(56) References Cited

U.S. PATENT DOCUMENTS

| | | | |
|---|---|---|---|
| 6,942,059 B2 | 9/2005 | Smith | |
| 7,218,572 B2 | 5/2007 | Parkes | |
| 7,859,945 B2 | 12/2010 | Sallas et al. | |
| 2001/0020218 A1 | 9/2001 | Cosma | |
| 2002/0008197 A1 | 1/2002 | Mickael | |
| 2004/0089499 A1 | 5/2004 | Smith | |
| 2004/0136266 A1 | 7/2004 | Howlid et al. | |
| 2006/0076183 A1* | 4/2006 | Duren | G01V 1/04 181/121 |
| 2007/0133354 A1* | 6/2007 | Bagaini | G01V 1/005 367/189 |
| 2009/0076730 A1 | 3/2009 | Johnson et al. | |
| 2010/0067326 A1* | 3/2010 | Iranpour | G01V 1/3808 367/20 |
| 2010/0118647 A1* | 5/2010 | Tenghamn | G01V 1/005 367/24 |
| 2010/0195434 A1 | 8/2010 | Menger et al. | |

OTHER PUBLICATIONS

International Search Report and Written Opinion of PCT Application No. PCT/IB2012/051153 dated Oct. 19, 2012: pp. 1-11.

International Search Report and Written Opinion of PCT Application No. PCT/IB2012/051154 dated Oct. 18, 2012: pp. 1-9.

Houston et al., "OTC 5641: A Marine Digital Vibrator: Part II—Implementation," 20th Annual Offshore Technology Conference, May 1988: pp. 223-226.

Laws et al., "B026: Are Seismic Sources Too Loud?" 70th EAGE Conference & Exhibition, Jun. 2008: pp. 1-5.

"LGL Report TA4604-1: Environmental Assessment of Marine Vibroseis," LGL Ltd., environmental research associates and Marine Acoustics Inc., Apr. 2011: pp. 1-227.

Southall et al., "Marine Mammal Noise Exposure Criteria: Initial Scientific Recommendations," Aquatic Mammals, 2007, vol. 33(4): pp. 411-521.

* cited by examiner

MARINE VIBRATOR SWEEPS

BACKGROUND

This disclosure relates to seismic exploration for oil and gas and, in particular but not by way of limitation, to marine seismic surveying using marine vibrators.

Seismic exploration involves surveying subterranean geological formations for hydrocarbon deposits. A survey may involve deploying seismic source(s) and seismic sensors at predetermined locations. The sources generate seismic waves, which propagate into the geological formations, creating pressure changes and vibrations along the way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), and others are sensitive to particle motion (e.g., geophones); industrial surveys may deploy one type of sensor or both types. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may not only be conducted in saltwater environments, but also in fresh and brackish waters. In one type of marine survey, called a "towed-array" survey, an array of seismic sensor-containing streamers and sources is towed behind a survey vessel. In one type of survey, called a "marine vertical seismic profile (marine VSP)" survey, an array of sensors is deployed in a borehole and the seismic source is either moving (e.g. towed behind a vessel) or stationary (e.g. suspended from a structure such has a drilling rig). In one type of marine survey, incorporating both hydrophones and geophones, called an "Ocean Bottom Cable (OBC)" survey, sensors are laid on the seabed. In another type of marine survey, the sensors are deployed in other ways and the seismic source is deployed in the water in some way, where the sensors or sources can be either moving or stationary. Other surveys are known as "land" surveys because they are conducted on land environments. Land surveys may use dynamite or seismic vibrators as sources. Arrays of seismic sensor-containing cables are laid on the ground to receive seismic signals. The seismic signals may be converted, digitized, stored or transmitted by sensors to data storage and/or processing facilities nearby, e.g. a recording truck. Land surveys may also use wireless receivers to avoid the limitations of cables. Seismic surveys may be conducted in areas between land and sea, which is referred to as the "transition zone".

Theoretically, in marine seismic surveys, the sources can be impulsive sources (e.g. airguns) or continuous sources (e.g. marine seismic vibrators). However, in general, marine seismic vibrators are not used in practice. It is desirable to be able to make marine seismic vibrators another practical type of source for marine seismic surveys.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to methods and apparatuses for marine seismic surveys where a marine seismic vibrator is used as the source for the survey. The methods of embodiments of the present invention include using a vibrator sweep function for the marine seismic vibrator based on a quality requirement, rather than on a requirement to match the output energy of the marine seismic vibrator to an airgun or to produce a flat spectrum. The quality requirement may be based on final image qualities (signal to noise ratio or the like) and/or environmental impact/qualities (e.g. noise, environmental impact on marine fauna and/or the like).

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Figure 1:
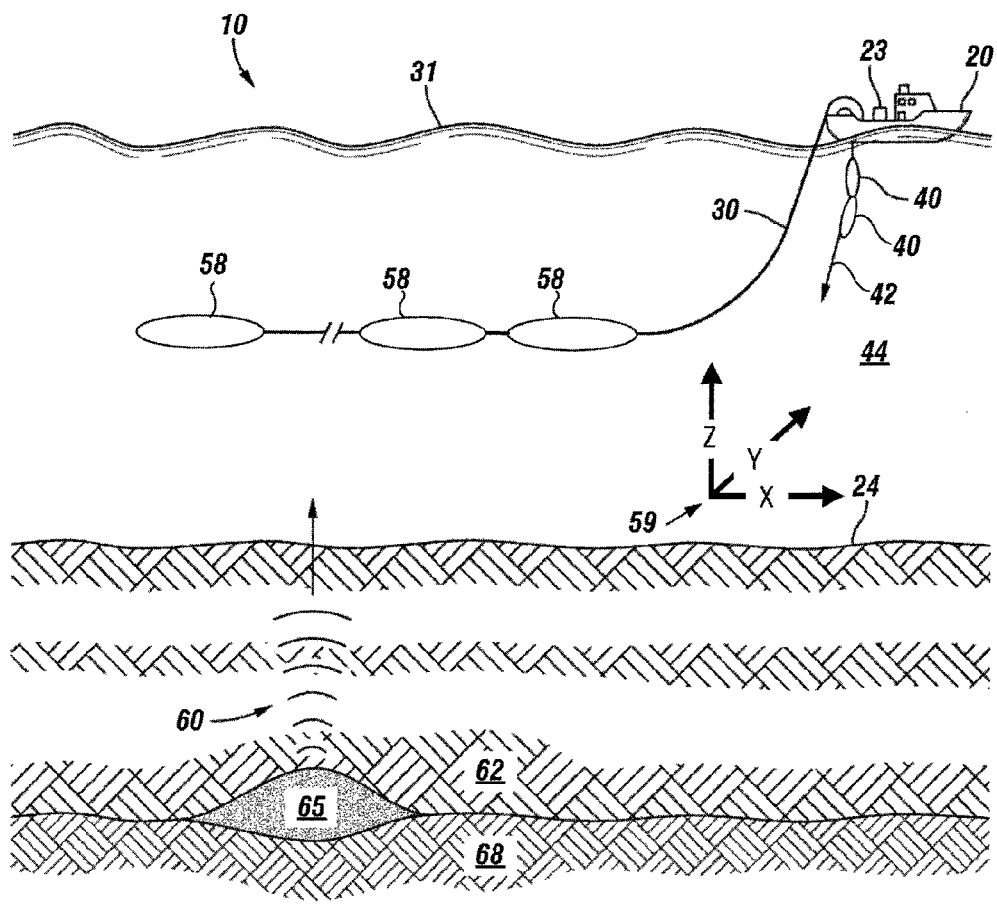
FIG. 1 illustrates a seismic acquisition system in a marine environment.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

FIG. 1 depicts a marine-based seismic data acquisition system 10. In system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors 58 that record seismic signals. The streamers 30 contain seismic sensors 58, which may be hydrophones to acquire pressure data, geophones to acquired motion data, or multi-component sensors. For example, sensors 58 may be multi-component sensors, with each sensor capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

The multi-component seismic sensor may include one or more hydrophones, geophones, particle displacement sensors, particle velocity sensors, accelerometers, pressure gradient sensors and/or the like and/or combinations thereof.

The marine seismic data acquisition system 10 includes one or more seismic sources 40 (two seismic sources 40 being depicted in FIG. 1), such as airguns or other sources. The seismic sources 40 may be coupled to, or towed by, the survey vessel 20. The seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24. The acoustic signals 42 are then reflected from the various subterranean geological formations, such as a formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space which may result in spatial aliasing. The traces are recorded and may be at least partially processed by a signal processor in unit 23 that is deployed on the survey vessel 20, in accordance with some embodiments. For example, a particular seismic sensor 58 may provide a trace, which corresponds to a measure of a pressure wavefield by its hydrophone; and the sensor 58 may provide (depending the sensor configurations) one or more traces that correspond to one or more components of particle motion.

One of the goals of the seismic acquisition is to build up an image of a survey area for purposes of identifying subterranean geological formations, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, such as by the signal processor in unit 23. In other surveys, the representation may be processed by a seismic data processing system (such as a seismic data processing system 600 in FIG. 6 and is further described below) that may be, for example, located in an office on land or on the vessel 20.

A particular seismic source 40 may be formed from an array of seismic source elements (such as air guns or marine seismic vibrators, for example) that may be arranged in strings (gun strings, for example) of the array. A particular seismic source 40 may also be formed from one air gun, or a predetermined number of air guns, of an array, or may be formed from multiple arrays, etc. Regardless of the particular composition of the seismic sources, the sources may be fired in a particular time sequence during the survey.

Theoretically, either impulsive sources or continuous sources can be used in seismic surveys. In practice, both impulsive sources and continuous sources are used in seismic surveys performed on land. However, continuous sources (e.g. marine seismic vibrators) are almost never used in commercial marine seismic surveys. There are many characteristics of marine seismic vibrators that prevent them from being used as practical sources. One of the characteristics is the low acoustic power produced by marine seismic vibrators, especially at low frequencies, compared to airguns. In seismic surveying, low power at low frequencies may degrade the resulting seismic images to an unacceptable level. However, this same characteristic of marine seismic vibrators—low power—means that the marine seismic vibrators produce low environmental impact during surveys, which is desirable because of environmental protection, especially for the protection of marine fauna, which is of concern during seismic exploration. Compared to the impulsive sources (e.g. airguns) which can emit an impulse that covers the entire spectra all at once, a vibrator can vibrate at each individual frequency in the spectra in sequence to provide source energy to cover the entire spectra. The amount of time for a vibrator to sweep the entire spectrum is limited due to production or operational requirements. This constraint may also limit the total energy over the entire spectrum produced by the marine seismic vibrators.

Another aspect that limits marine seismic vibrators' usage in marine seismic surveys is the complexity of using a marine seismic vibrator to replicate the output energy spectrum of a common airgun array. Previously, the use of marine seismic vibrators has not been desirable, practicable and/or the like because it may take complex arrangements, such as the system and method disclosed in U.S. Pat. No. 6,942,059, titled "Composite Bandwidth Marine Vibroseis Array" assigned to the current assignee, to configure a marine seismic vibrator to produce an output/sweep that is equivalent to that of an airgun or airgun array.

Figure 2:
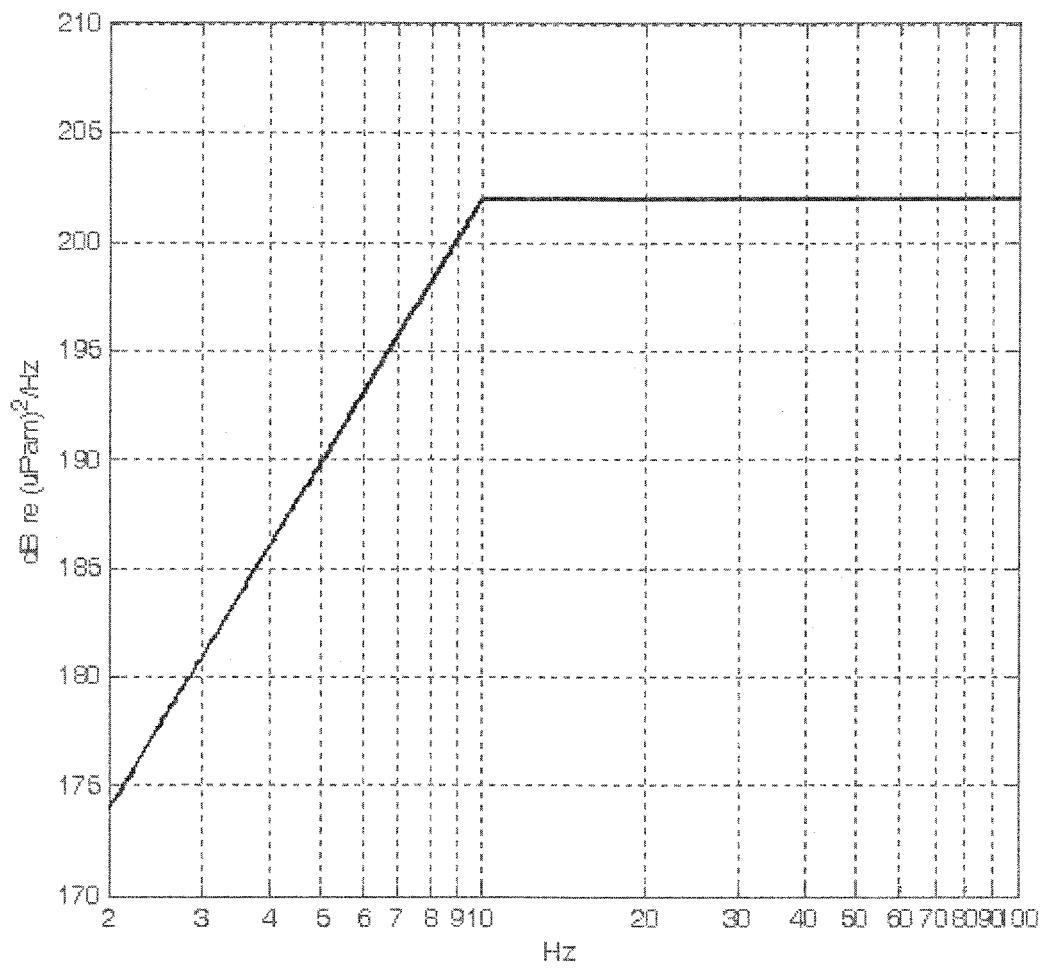
FIG. 2 illustrates a monochromatic output power Em(f) of a marine vibrator.
Figure 5:
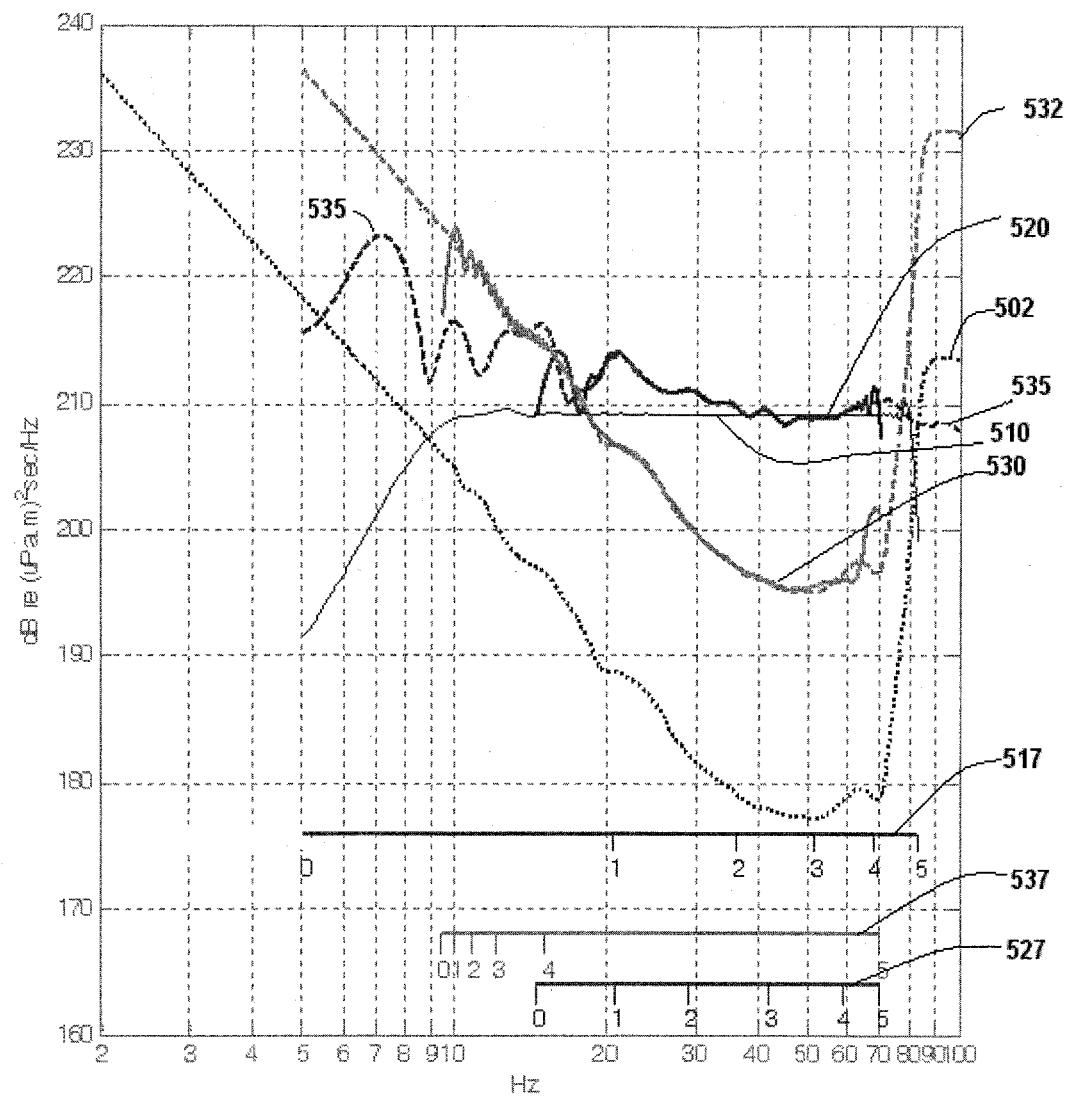
FIG. 5 illustrates several sweep functions and their SNR.

FIG. 2 illustrates an example of monochromatic output power spectra Em(f) of a marine seismic vibrator for illustrative purposes. The output power is substantially constant above a certain roll-off frequency. In this example it is about 10 Hz. Below this roll-off frequency, the output power rolls-off and eventually becomes insufficient for a seismic survey. The roll-off may be caused by the finite swept volume of the vibrator and may be proportional to the frequency squared. For seismic surveys, frequency content (e.g. several Hz) below this roll-off frequency (e.g. 10 Hz) may still be needed. The plateau above the roll-off frequency may be caused by limitations in the mechanism that drives the vibrator. The output power spectra from a marine seismic vibrator as shown here is very different from the power spectra of a common airgun, one of which is illustrated in FIG. 5, curve 535, which will be discussed later. It is difficult to use a marine seismic vibrator to achieve the power spectra of an airgun.

Figure 3:
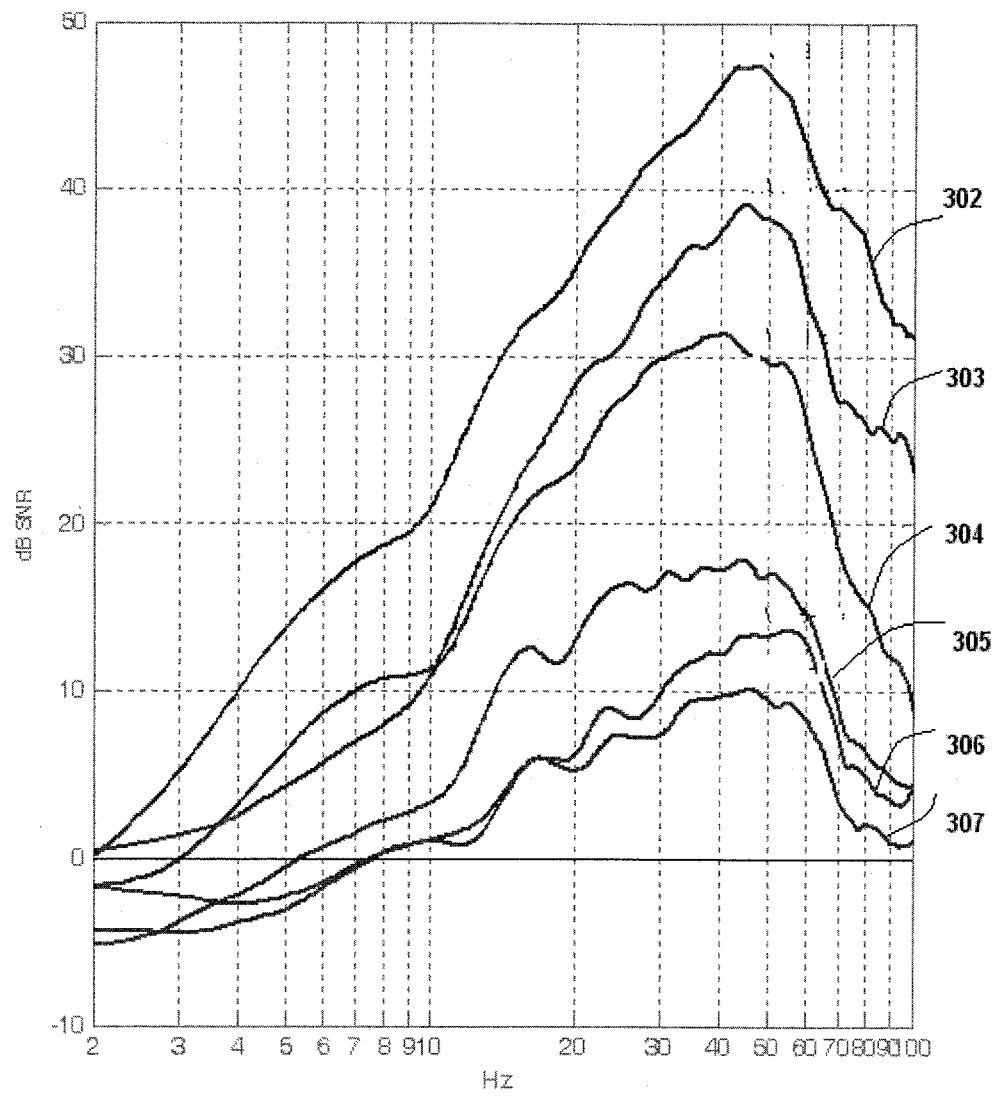
FIG. 3 illustrates example signal-to-noise ratios (SNR) in a 2D seismic image for different depths in the image.

FIG. 3 illustrates some SNRs in a seismic image where the data were acquired using an airgun array. It illustrates the relationships between seismic image quality and various parameters in acquiring the seismic data. The data were derived from a conventional 2D seismic line that was acquired in the Gulf of Mexico using an airgun array. The same line was also acquired without firing the airguns (stealth section with noise only) so that the noise image could be created using the same processing. The image data were sliced into one second windows, depending on the target depth, in terms of TWT, (TWT=two way time, the travel time from the source to the target and from the target to the receiver). The one second window image data are transformed into frequency domain, and then divided by the noise spectra to derive SNR as shown in FIG. 3. Each curve (302-307) shows the SNR for the image in the one second window, e.g. curve 302 is for a window of TWT 2-3 seconds, curve 303 is for TWT 3-4 seconds, curve 304 is for TWT 4-5 seconds, 305 is for TWT 5-6 seconds, 306 is for TWT 6-7 seconds, and 307 is for TWT 7-8 seconds. An image that has a minimum SNR of about 20 decibels (dB) might often be considered of good quality. While an SNR below 20 dB at some spectra may degrade a seismic image, sometimes to an unacceptable level, an SNR greatly above 20 dB at other parts of the data do not confer any benefit for the resulting seismic image as a whole. For example, for TWT at 4-5 seconds (304) at 40 Hertz (Hz), the output is about 32 dB above noise, which is 12 dB higher than it needs to be to give a 20 dB image. For shallow targets (e.g. for TWT less than 4 seconds), the 20 dB SNR range is fairly large (about 12 Hz and above in this example). At targets with TWT=4-5 seconds (304), for example, a SNR of 20 dB is achieved between about 15 Hz and 70 Hz. At deeper targets (305, 306 or 307), the SNR is insufficient for the 20 d B quality level. While for shallow targets, the SNRs are greatly above the needed quality, for deeper targets (TWT greater than 6 seconds), the SNR may be insufficient.

From FIG. 3, where the source is an airgun, it can be seen that the energy density distribution is uneven. At the high frequency end, there is more energy from the airgun than necessary for a set image quality, i.e. at a desired SNR requirement. The energy spectrum of an airgun is not optimal for seismic imaging purpose. Consequently, to obtain a seismic image at a set image quality, it is not necessary to match the energy density spectra to that of airguns. In other words, when marine vibrators are used, they do not need to match the spectra of airguns. In embodiments of the present invention, marine seismic vibrators may be used to provide certain spectral energy density based on resulting seismic image quality, rather than the spectral content of an airgun. In embodiments of the present invention, such image quality based spectral energy distribution, or sweep functions for marine seismic vibrators may be more beneficial and efficient.

In this disclosure, the marine seismic vibrator(s) may be controlled/driven to produce a seismic sweep/sweep function that is configured to provide and/or is based on a quality requirement, rather than on a requirement to match the output energy of a typical airgun array or to produce a standard flat-spectrum. In accordance with methods or apparatuses disclosed below, by configuring the marine seismic vibrators for a sweep function based on image quality requirement or other quality requirement, the marine vibrator may be able to provide sufficient energy for a seismic survey. In aspects of the methods discussed below, a sweep function for a marine seismic vibrator may be designed based upon an image quality requirement and/or an environmental impact quality requirement. In this way, a marine seismic vibrator may be configured to produce a seismic sweep that is more environmentally friendly than is produced by an airgun source. In addition, in some embodiments, a sweep may be changed during the seismic survey as the noise and/or environmental impact conditions change.

For ease of discussion, the quality of image as defined by SNR is set at an arbitrary level, e.g. 18 dB for the remaining discussion. This SNR quality level may be set at a higher (e.g. 20 dB as used earlier) or lower level, depending on the needs or uses of the resulting image. The sweep functions can be determined that give that SNR over as wide a frequency range as possible. The SNR might be chosen to be a function of frequency.

Figure 4:
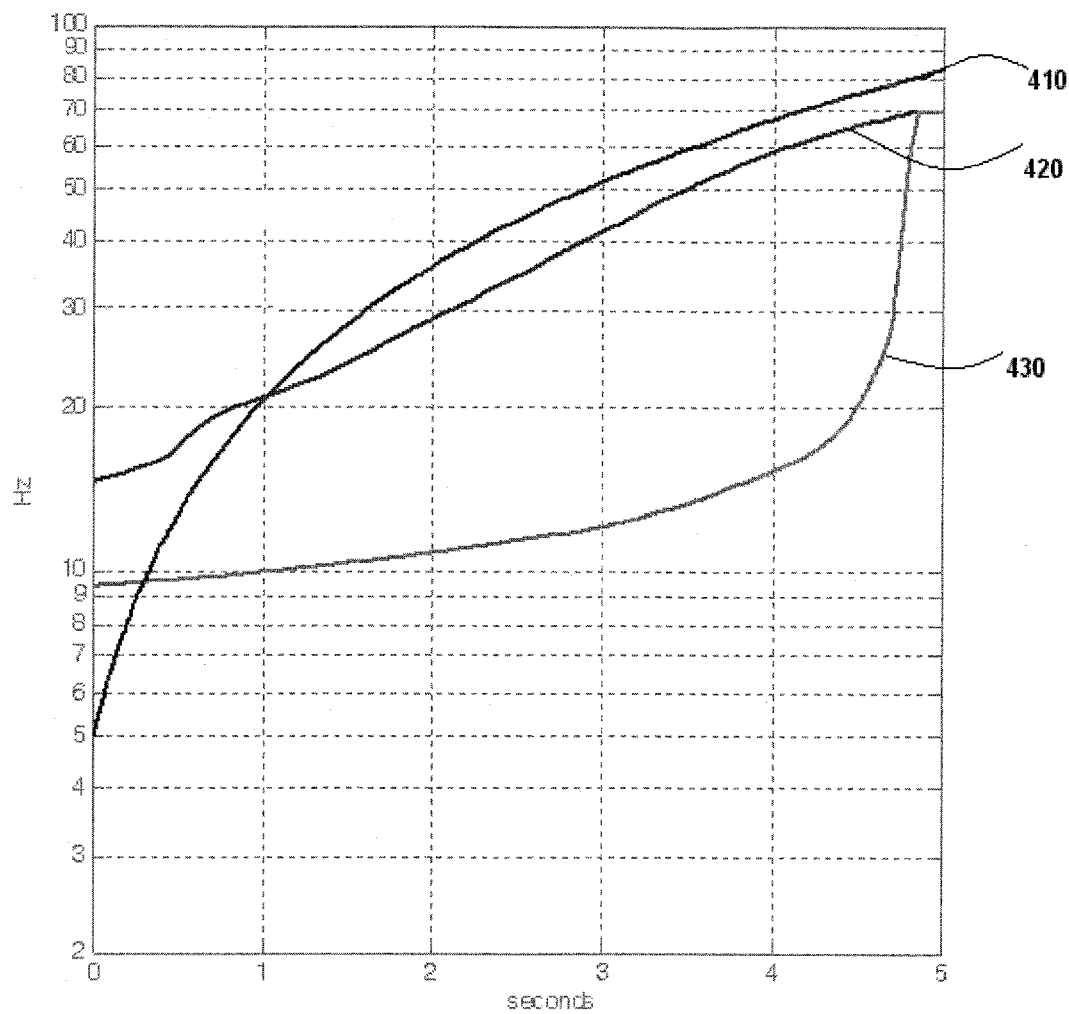
FIG. 4 illustrates several sweep functions.

FIG. 4 illustrates three sweep functions for marine vibrators and FIG. 5 illustrates their corresponding energy curves in terms of SNR. In FIG. 4, the horizontal axis is time (seconds) in linear scale while the vertical axis is frequency (Hz) in logarithmic scale. The blue curve 410 illustrates a linear sweep (meaning that the frequency is a linear function of time), which is a common sweep scheme for vibrators; the red curve 420 is a sweep that matches the spectra content of an airgun; and the orange curve 430 is a sweep that is based on an 18 dB image SNR requirement. The orange sweep 430 matches a specified image SNR requirement at a desired/defined target depth and/or minimizes the emission of superfluous acoustic energy. Using the orange sweep 430, vibrators may produce the best image quality among the three sweeps 410, 420 and 430. Moreover, synergistically, the orange sweep 430 is more environmentally friendly than the other two sweeps.

FIG. 5 illustrates equivalent source energy levels in dB for sweeps illustrated in FIG. 4 and a background noise energy level. The horizontal axis is frequency in Hz in logarithmic scale; the vertical axis is source energy level in dB. The black dotted curve 502 is the background noise energy spectra, equivalent to that measured in the examples as shown in FIG. 3. A noise source with this level, when passed through the processing, gives an image noise the same as that in FIG. 3. To achieve a constant 18 dB image quality, a source may have an energy curve as the orange dotted curve 532, which is 18 dB above the background noise 502. The solid blue curve 510 is the linear sweep; the solid red curve 520 is the sweep that tries to match the energy spectra of an airgun, which is the dotted red curve 535 that extends on both sides of the solid red curve 520. Because the sweep time is limited, in this example, 5 seconds, a marine seismic vibrator may not cover the entire spectrum 535 of an airgun. In some operations, the sweeping time may be extended to 10, 15 seconds or longer, to obtain data from deeper targets. In those cases, the frequency band may also be extended, on either the low frequency end or high frequency end, or both. The solid orange curve 530 is the sweep that follows the 18 dB SNR curve. FIG. 5 illustrates the energy spectral density for targets at 4-5 sec TWT.

Knowing the background noise level as shown in the black dotted line 502, a sweep that has constant SNR is simply the orange dashed curve 532, which is the background noise sweep plus the desired SNR, i.e. 18 dB. The background noise 502, as illustrated in this example, has a large barrier above about 80 Hz resulting from the source depth that was used in the test that generated the data in FIG. 3 and rises steadily below about 20 Hz as frequency decreases. The source noise level 502 is that which, if emitted by a source and then processed to an image in the same as the signal is, would yield an image noise level that matches the level found in the image of the test that generated the curves in FIG. 3. Curve 502 is the image noise expressed as an equivalent source level.

In a linear sweep 510 (blue line), the energy is spread out between a large range from about 5 Hz to about 83 Hz. However, the range with 18 dB SNR is about 19-80 Hz. At the low frequency end, the source energy holds flat till about 10 Hz and then decreases, while noise energy goes up steadily; the SNR degrades quickly at low frequencies. In an embodiment of the present invention, if a survey uses this type of a sweep, the useable frequency range is about 19-80 Hz. The sweep line 517 near the bottom of FIG. 5 illustrates that the sweep covers the entire frequency range 5 Hz to 83 Hz with equal amounts of time.

In a sweep 520 that simulates the airgun spectra (red line), the source energy does not fall as frequency decreases at the low frequency end. In order to cover the spectrum while still within the 5 second sweep time, the range of frequency swept is less than the linear sweep 510. In this case, the sweep range is from about 12 Hz to about 70 Hz (see the bottom red line 527). For nearly the entire sweep, the SNR is above the quality requirement, the 18 dB. The useable frequency range at low frequency end extends to 12 Hz, compared to the 19 Hz for a linear sweep 517. If an actual airgun is used, the spectra would be extended to the dotted red line 535, which ends at about 5 Hz. The spectrum range would be larger, but the useable spectra range (i.e. SNR above 18 dB) would be substantially the same in this example.

In a sweep 530 that follows a constant SNR (orange line 530), the frequency coverage is the largest, from about 9.5 Hz to 70 Hz. In this case, the majority of the sweep time is spent in sweeping the low frequency end, where the energy need is the greatest and when the vibrator monochromatic power is often the most limited. For example, the vibrator spends one second just to cover the lowest frequency band from about 9.5 Hz to 10 Hz, and 4 seconds for frequencies below about 16 Hz, while a large high frequency band, from 16-70 Hz is covered in one second. In this sweep 530, the useable frequency range is about 9.5 Hz to 70 Hz. The low end frequency extended to below 10 Hz, compared to airgun sweep 520 to 12 Hz, linear sweep 510 to 19 Hz.

Sweep 530 is highly non-linear. In this example, the vibrator spends 4.2 seconds (about 85% of the 5 seconds sweep time) sweeping through low frequency band 9.5-18 Hz (8.5 Hz, or about 15% of the 61.5 Hz bandwidth); while spending 0.8 seconds (about 15% of sweep time) sweeping through the remaining high frequency band 18-70 Hz (52 Hz, or about 85% of the 61.5 Hz bandwidth).

Sweep 530 is very different from the behavior of the marine seismic vibrator when it is used to produce a conventional linear sweep 510 or a sweep 520 that is designed to match one produced by an airgun array (red). These last two sweeps 510 and 520 by the marine seismic vibrator emit too much energy at mid to higher frequencies, for example, above about 17 Hz. Sweeps 510 and 520 emit too little energy at lower frequencies, for example, below about 17 Hz. They do not produce the necessary/desired SNR across the sweep frequencies.

In the examples illustrated in FIGS. 4 and 5, the sweep time is limited to 5 seconds. If sweep time were extended, then more energy would be available and more frequency range would be covered.

Figure 7:
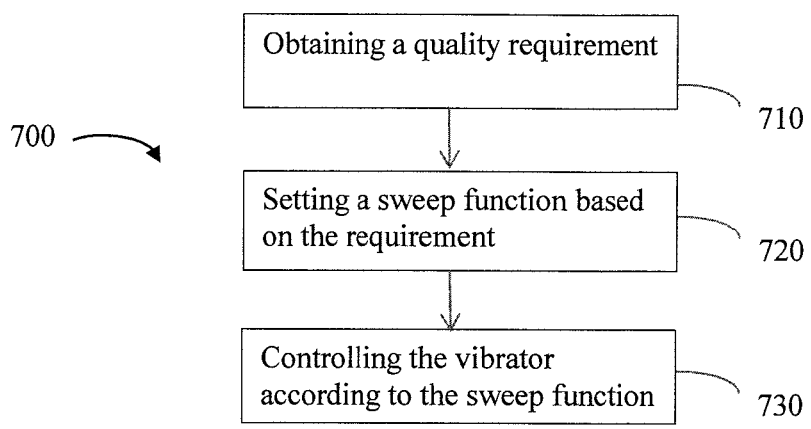
FIG. 7 illustrates a flow diagram for a method according to one embodiment of the present invention.

One embodiment of the present invention, method 700, may be summarized in a flow diagram as shown in FIG. 7. The method 700 using marine seismic vibrator may proceed as follows:

Obtaining a quality requirement, e.g. SNR over an image background noise over the image bandwidth (710);

Setting a sweep function that based on the quality requirement, e.g. the energy curve that is 18 dB above the background noise (720);

Controlling the vibrator according to the sweep function (730) and collecting data.

The quality requirement can be an image quality requirement of a final image, such as a set SNR. The image quality requirement can be a set of functions of frequencies, not necessarily related to SNR. The quality requirement can be an environmental quality requirement, such as an energy limitation at certain frequency range for marine mammal protection or a limit on superfluous emitted energy. When SNR is used, the image background noise may be obtained from direct measurement of the noise and an approximation to the processing method, as in the above example or from past experience in a similar survey area, similar weather or survey equipment. The direct measurement may be done prior to a survey, as in the above example. The direct measurement of noise may also be done during a survey in real-time, i.e. let sensors record signals while the sources are not activated. The sweep function may be determined based on the real-time noise.

The background noise may also be estimated from general knowledge of the survey design, experimentation, modeling and/or the like. The quality requirement may be a compromise between several goals, for example, the sweep design factor may include the geophysical goals of: (1) required image SNR; (2) low and high frequency limits of the image bandwidth; (3) environmental goals, including but not limited to minimizing environmental impact assessed, for example, by minimizing superfluous emitted acoustic energy.

In one embodiment, the design of the sweep for the marine seismic vibrator/marine seismic vibrator array may take place before the survey is conducted, using assumed values for the noise spectra, the earth seismic response, the SNR, the processing sequence and/or the environmental requirements. In other embodiments, the design of the sweep for the marine seismic vibrator/marine seismic vibrator array may be calculated/determined/processed during the survey using noise records, SNR, sweep characteristics and/or the like acquired, for example, at the start and/or end of each seismic sweep. This may be used to revise the sweep during the survey in the light of the particular noise conditions that are encountered at the time. The sweep may also be modified to take account of locally varying environmental requirements such as the actual positions of marine mammals in the area at the time of the seismic survey.

In operation, more than one marine seismic vibrator may be deployed, as multiple sources 40 illustrated in FIG. 1. The vibrators may be deployed at various depth (e.g. over/under configurations), or in-line or cross-line locations for desired wavefield formation.

For simplicity, FIG. 1 only illustrates a towed marine seismic survey, which is one of the many marine seismic surveys. In a towed marine seismic survey, both sensors and sources are towed by one or more vessels and travel along with the towing vessels during the survey. There can be many other types of marine seismic surveys, as mentioned before. In some of these surveys, the sensors can either be stationary or moving during a survey. The sources (e.g. marine seismic vibrator) can also be either stationary or moving during a survey.

Part of the methods discussed above may be easier to understand using math formulas. A sweep for a marine seismic vibrator may be designed based on required properties of the resulting seismic image. The down-going source energy spectrum of a marine seismic vibrator array, excluding effects of the sea surface reflection, is given approximately by:

$$S(f) = N^2 * Em(f) * (dt/df)$$

where: $Em(f)$ is the power emitted by a single vibrator if it is driven continuously at a single frequency f. $Em(f)$ is a characteristic of a vibrator, which may vary from vibrator to vibrator. An example is illustrated in FIG. 2. N is the number of vibrator units.

If the source energy spectrum $S(f)$ is defined then $dt/df$ can be determined and thence $f(t)$, which is the sweep function. For a linear sweep, $df/dt$ is a constant. When a vibrator is used to simulate an airgun, $S(f)$ is the energy spectrum of an airgun, as curve 535 shown in FIG. 5. The sweep function to generate the energy spectrum is also shown in FIGS. 4 and 5.

In operation, the available duration of the sweep and the number of marine seismic vibrator units in the vibrator array limits the range of frequencies over which the spectrum sweep produced by the marine seismic vibrators can be made to match a given source energy spectrum requirement, e.g. $f(t_{max})=f_{max}$, then $f(0)=f_{min}$. For example, in order to match a desired sweep, such as that produced by an airgun array, the marine seismic vibrator may be driven to produce a spectra match at some upper frequency of the desired sweep. Then the sweep maybe designed downwards from this upper frequency until the sweep duration limit is reached. The sweep duration would then impose a low frequency limit on the spectrum of the sweep; below this limit it would not meet the requirement. This is illustrated in FIG. 5 (red curve 520). When the maximum frequency 70 Hz and sweep time of 5 seconds are set, the minimum frequency a sweep can reach is limited to about 16 Hz. To increase the frequency range (e.g. decrease the minimum frequency limit), one may increase the sweep time, although the increase of sweep time may decrease the survey productivity.

In some embodiments, more than one vibrator array may be used in a seismic survey. In such cases, the sweep design methods may be applied to each marine seismic vibrator array. Marine seismic vibrators may be deployed at a range of depths and the methods discussed here can be applied to any depth.

In some embodiments, a new marine vibrator array may be manufactured or adapted from existing vibrators. The marine vibrator array can be used as a source for marine seismic surveys. The marine vibrator array has at least one marine seismic vibrator. A vibrator controller is associated with the vibrator array, where the vibrator controller can control the operation of the vibrator to sweep through frequency ranges according to one or more sweeping functions. The sweep function can be based on a quality requirement. The sweep function can be a function of frequency. The quality requirement may be any one of the quality requirements mentioned above. The vibrator controller can be a dedicated controller or as part of a control system for the survey. The vibrator array may be towed by a dedicated source vessel or by a seismic vessel which tows marine streamers for the survey.

In the above discussion, the examples are based on 2D surveying data. However, for 3D seismic surveys, the advantage of the methods or apparatuses discussed above might be greater because the stack-fold is larger. The above discussed methods or apparatuses may be equally applied.

As those with skill in the art will understand, one or more of the steps of methods discussed above may be combined and/or the order of some operations may be changed. Furthermore, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 600 in FIG. 6.

Figure 6:
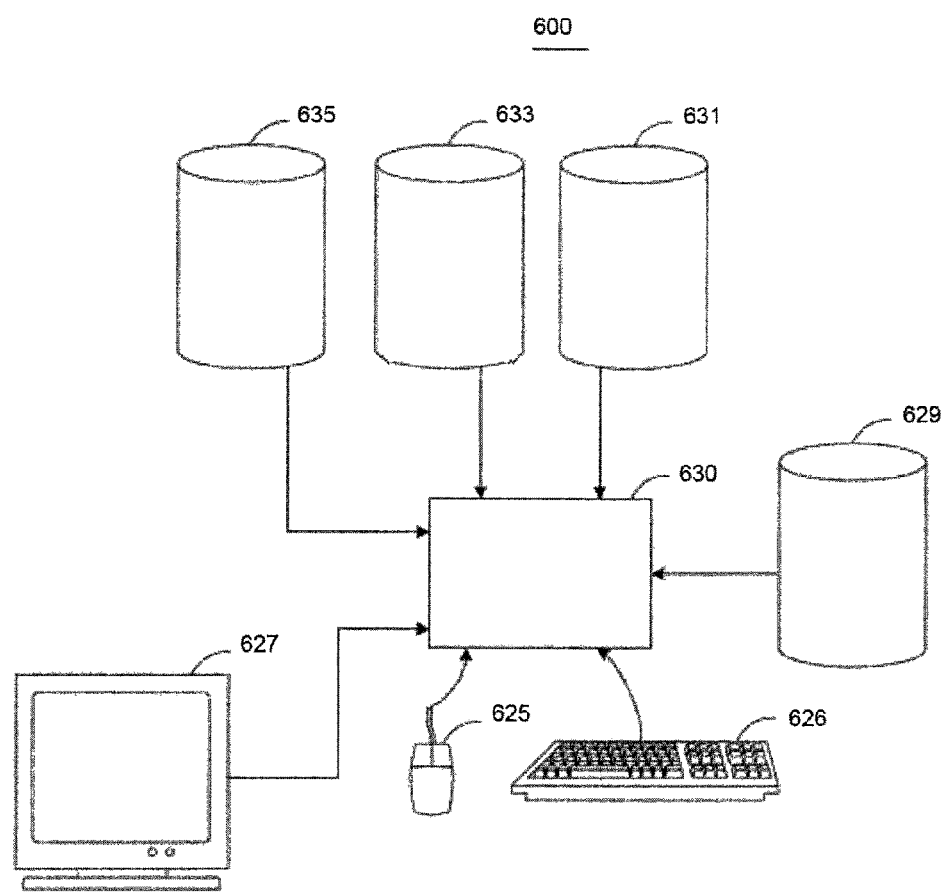
FIG. 6 illustrates a schematic view of a computer system on which some methods of the embodiments disclosed herein may be implemented.

Portions of methods described above may be implemented in a computer system 600, one of which is shown in FIG. 6. The system computer 630 may be in communication with disk storage devices 629, 631, 633 and 635, which may be external hard disk storage devices and measurement sensors (not shown). It is contemplated that disk storage devices 629, 631, 633 and 635 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 631. Various non-real-time data from different sources may be stored in disk storage device 633. The system computer 630 may retrieve the appropriate data from the disk storage devices 631 or 633 to process data according to program instructions that correspond to implementations of various techniques described herein. The program instructions may be written in a computer programming language, such as C++, Java and the like. The program instructions may be stored in a computer-readable medium, such as program disk storage device 635. Such computer-readable media may include computer storage media.

In one implementation, the system computer 630 may present output primarily onto graphics display 627, or via printer 628 (not shown). The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located on-site, e.g. as a part of unit 23 on-board a vessel 20 as in FIG. 1. The system computer 630 may be in communication with equipment on site to receive data of various measurements. Such data, after conventional formatting and other initial processing, may be stored by the system computer 630 as digital data in the disk storage 631 or 633 for subsequent retrieval and processing in the manner described above. While FIG. 6 illustrates the disk storage, e.g. 631 as directly connected to the system computer 630, it is also contemplated that the disk storage device may be accessible through a local area network or by remote access. Furthermore, while disk storage devices 629, 631 are illustrated as separate devices for storing input data and analysis results, the disk storage devices 629, 631 may be implemented within a single disk drive (either together with or separately from program disk storage device 633), or in any other conventional manner as will be fully understood by one of skill in the art having reference to this specification.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for operating a marine seismic vibrator as a source in a marine seismic survey, the method comprising:
    determining an image quality requirement and an environmental impact requirement, wherein the environmental impact requirement is a requirement of a limit on emitted energy at one or more frequencies in a sweep of the marine seismic survey;
    configuring a sweep function based on the image quality requirement and the environmental impact requirement; and
    sweeping the marine seismic vibrator according to the sweep function to produce a seismic source signal.

2. The method of claim 1, wherein the image quality requirement is specified for a set of frequencies.

3. The method of claim 1, wherein the image quality requirement is a set of signal-to-noise-ratio (SNR) requirements over an image bandwidth.

4. The method of claim 3, wherein a noise is measured and the set of SNR requirements are defined as SNR requirements that are a target level over the measured noise.

5. The method of claim 1, wherein the image quality requirement includes an image bandwidth requirement with a low frequency limit and a high frequency limit.

6. The method of claim 1, wherein the sweep function is non-linear.

7. The method of claim 6, wherein the sweep function is sweeping 85% of time at the lowest 15% of frequency band and sweeping 15 percent of time at the highest 85% of frequency band.

8. The method of claim 1, further comprising:
    receiving seismic data responsive to the seismic source signal; and
    processing the received seismic data to generate an image of a subterranean section of the Earth.

9. The method of claim 8, wherein the received seismic data is processed using characteristics of the sweep function.

10. The method of claim 1, wherein the sweep function is configured as a compromise between the image quality requirement and the environmental impact requirement.

11. An apparatus for a marine seismic survey, the apparatus comprising:
    at least one marine seismic vibrator; and
    a vibrator controller to control an operation of the at least one marine seismic vibrator, wherein:
        the vibrator controller is to operate according to a sweep function that when activated sweeps the at least one marine seismic vibrator through frequencies according to the sweep function; and
        the sweep function is based on an image quality requirement and an environmental impact requirement, wherein the environmental impact requirement is a requirement of a limit on emitted energy at one or more frequencies in a sweep of the marine seismic survey.

12. The apparatus of claim 11, wherein the image quality requirement comprises a signal-to-noise-ratio (SNR) requirement that specifies a target SNR over measured background noise across a plurality of frequencies.

13. The apparatus of claim 12, wherein the marine seismic vibrator is configured in use to be stationary when the marine seismic vibrator is activated.

14. The apparatus of claim 11, further comprising:
    at least one seismic sensor to acquire seismic data responsive to a seismic source signal output by the marine seismic vibrator when activated according to the sweep function.

15. The apparatus of claim 11, further comprising:
at least one marine streamer having marine seismic sensors; and
a marine vessel to tow the at least one streamer, the marine seismic sensors to acquire seismic data responsive to a source seismic signal output by the marine seismic vibrator when activated according to the sweep function.

16. The apparatus of claim 15, wherein the image quality requirement comprises a signal-to-noise-ratio (SNR) requirement over an image bandwidth based on noise measured by the marine seismic sensors.

17. A non-transitory machine readable media containing machine readable instructions, which when executed by a processor cause a controller to:
operate a marine seismic vibrator to emit seismic energy according to a sweep function, wherein the sweep function is based on an image quality requirement and an environmental impact requirement, wherein the environmental impact requirement is a requirement of a limit on emitted energy at one or more frequencies in a sweep of a marine seismic survey.

18. The non-transitory machine readable media of claim 17, wherein the image quality requirement is a function of sweeping frequencies.

19. The non-transitory machine readable media of claim 18, wherein the image quality requirement is an image bandwidth requirement with a low frequency limit and a high frequency limit.

20. The non-transitory machine readable media of claim 17, wherein the image quality requirement comprises a signal-to-noise-ratio (SNR) requirement over an image bandwidth that is a target SNR over measured noise.

* * * * *